UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF COATING CONCRETE.

999,493.   Specification of Letters Patent.   Patented Aug. 1, 1911.

No Drawing.   Application filed October 22, 1910. Serial No. 588,549.

*To all whom it may concern:*

Be it known that I, CARLETON ELLIS, a citizen of the United States, and a resident of Montclair, in the county of Essex and State of New Jersey, have invented certain new and useful Improvements in Processes of Coating Concrete, of which the following is a specification.

This invention relates to a process of treating concrete coating composition and contains divisional matter from Serial No. 552,178, filed March 29, 1910 for binding and coating composition.

In the treatment of cement for the purpose of applying finishes, it has heretofore been customary, generally speaking, to make use of acid washes of one kind or another in order to neutralize the caustic lime and other caustic alkalis which are present in cement. Owing to the fact that the alkalis saponify ordinary drying oils and resins and makes them in the saponified condition, very sensitive to the action of moisture and other atmospheric influences, such materials as zinc sulfate or alum, carbonate of ammonia, hydrochloric and sulfuric acid have been proposed as the bases of washes to be applied to the surface to act as neutralizing agents. These are more or less effective but troublesome to use. By applying in aqueous solution, they render the surface moist and a delay is required to permit the cement to dry sufficiently so that the finished coating may be applied. Some of these more strongly acid washes also destroy more or less the bonded condition of the cement surface. Fatty acids from linseed and other oils have also been proposed likewise some resin acids, but these are expensive and involve the necessity of a binding coat which in the present invention may be dispensed with. In other words, the same idea prevailing in these processes heretofore applied is that of neutralizing the cement surface before applying the actual finished material.

The present invention involves the application to concrete of an unsaponifiable resin preferably without a drying oil, and in particular, involves the use of a class of rubber resins which have little or no saponifying value among which Pontianac resin is particularly effective and inexpensive.

Pontianac rubber resin is produced in large quantities in the refining of Pontianac gum. It has the disadvantage for ordinary varnish purposes of coagulating in ordinary solvents especially in the presence of considerable amounts of oil and resins, and oftentimes forms a thin paste of magma and causes the solution to set and "crystallize." Sometimes it may be put into clear solutions and then when this is applied, the setting or crystallization occurs forming a friable coating which is white and effected by moisture. Again, a solution may be prepared which is sufficiently liquid for the purpose desired and after standing for a few months in the container will perhaps thicken and set so that it cannot be used. I have found however that hydrocarbons derived from coal tar and in particular benzol and its homologues, toluol and xylol form a solution remarkably well adapted for use on concrete surfaces, for in such solution, the coagulation heretofore referred to does not take place when Pontianac resin is used as the basis but the composition dries to form a hard, clear, firm, closely adhering coat which because of its freedom from saponifiable matter is unaffected by the alkalis contained in the cement and therefore makes unnecessary the application of a neutralizing or acid-priming coat. Such a composition is inexpensive and easily applied. It has such extremely good adherence and waterproofs the concrete surfaces so well that it acts as a most excellent preservative and as a basis for the application of coloring agents. Under the present invention therefore, a new product or article of manufacture is thus secured, namely, a concrete block or concrete mass superficially coated with Pontianac or similar unsaponifiable resin, serving if desired as a binding material for a pigment.

By using thin solutions in the first instance with the pigment, a considerable degree of impregnation may be secured so that the surface becomes impregnated with the waterproofing unsaponifiable material and a new product is derived, namely, a waterproof concrete having an exposed surface superficially impregnated and coated with Pontianac or other substantially unsaponifiable resin with or without pigment; which statement comprehends the process of this invention, namely, the method of waterproofing concrete by superficially impregnating and coating its exposed surface through the agency of solutions of Pontianac rubber resin or mediums comprising a substantially unsaponifiable resin, with or without pigment, such solutions being preferably sufficiently thin or limpid so as to preferably secure a considerable degree of impregnation near the surface of the concrete article.

An effective composition is prepared by melting 160 pounds of Pontianac resin and adding 20 gallons of toluol and then 25 gallons of benzol. This it will be quite evident affords a solution containing about four and one half pounds of resin per gallon of solvent or in other words less than two parts of solvent to one part of resin. This may be suitably colored with any pigment which is fast to alkalis. Prussian blue and similar coloring materials which are affected by alkalis should of course be avoided. Pigments ground in oil may of course be used if desired but they should be pastes in most instances to avoid the use of any great amount of drying oil owing to its occasional tendency to cause setting and crystallization with the formation of a poor film which is not properly impervious to moisture. The above composition may be applied to the concrete surface by means of a brush or by the ordinary paint sprayer.

In the foregoing, the toluol acts as the true solvent and the benzin merely as a thinner, and as the benzin is more volatile than the toluol, it evaporates more quickly on exposure, leaving a residue of toluol and thus affords opportunity to clarify the Pontianac resin film and render it clear and impervious.

For very hard, smooth finished concrete surfaces, guayule resin may also be employed to a more or less extent. As it is slightly saponifiable, it is not used to advantage alone but in the presence of an excess of Pontianac resin, its slightly saponifiable qualities are very largely suppressed and its adhesiveness operates to aid in securing a good bonding of the composition with the highly finished cement surface referred to. A satisfactory formula is as follows: 3 parts of Pontianac resin; 1 part guayule resin; 4 parts light benzin; 2 parts of benzol of a rather heavy grade. Linseed and other drying oils, should generally speaking, be avoided in a mixture of this character or reduced to a minimum in order to avoid any tendency to thicken or "crystallize."

The compositions set forth herein are merely for the purpose of illustration, the subject matter thereunder being claimed under separate applications Serial No. 608888 and particularly Serial No. 628,577.

What I claim is:—

1. The process of waterproofing concrete which comprises superficially impregnating and coating the exposed surface of the concrete with a medium comprising a substantially unsaponifiable resin.

2. The process of waterproofing concrete, which comprises superficially impregnating and coating the concrete with a medium comprising an unsaponifiable rubber resin.

3. The process of waterproofing concrete which comprises superficially impregnating and coating the exposed surface of the concrete with a medium comprising Pontianac rubber resin.

4. The process of waterproofing concrete which comprises superficially impregnating and coating the exposed surface of the concrete with a medium comprising Pontianac rubber resin and a pigment.

Signed at Montclair in the county of Essex and State of New Jersey this 20th day of October A. D. 1910.

CARLETON ELLIS.

Witnesses:
BIRDELLA M. ELLIS,
NATHANIEL L. FOSTER.